United States Patent
Ingwersen et al.

[11] Patent Number: 5,132,513
[45] Date of Patent: Jul. 21, 1992

[54] GUN FOR GAS METAL ARC WELDING

[76] Inventors: John A. Ingwersen, 50 Thurman Ave.; Thomas D. Montague, 4711 High Vista Dr., both of Columbus, Ohio; Robert G. Reed, R.R. #1, Box 427, Rd. 1000 W., Elizabethtown, Ind.

[21] Appl. No.: 698,123

[22] Filed: May 10, 1991

[51] Int. Cl.⁵ .............................................. B23K 9/00
[52] U.S. Cl. ............................ 219/137.31; 219/137.9
[58] Field of Search ................ 219/137.31, 137.51, 219/137.9

[56] References Cited

U.S. PATENT DOCUMENTS

| | | |
|---|---|---|
| 3,428,778 | 2/1969 | Blackman et al. ............. 219/132.31 |
| 3,689,733 | 9/1972 | Matasovic ....................... 219/137.31 |
| 3,783,233 | 1/1974 | dal Molin . |
| 3,836,747 | 9/1974 | Wios . |
| 4,072,828 | 2/1978 | Thome . |
| 4,158,763 | 6/1976 | Moerke . |
| 4,270,824 | 6/1981 | Erickson . |
| 4,401,878 | 8/1983 | Roen . |
| 4,403,136 | 9/1983 | Colman . |
| 4,540,871 | 9/1985 | Corrigall et al. . |
| 4,549,068 | 10/1985 | Kensrue .......................... 219/137.31 |
| 4,695,702 | 9/1987 | Gartland . |
| 4,727,238 | 2/1988 | Mann . |
| 4,731,518 | 3/1988 | Parmelee . |

Primary Examiner—Clifford C. Shaw
Attorney, Agent, or Firm—Thomas S. Baker, Jr.

[57] ABSTRACT

A gas arc metal welding gun has a handle which may be rotated freely with respect to a conduit containing a current transfer wire and a gas tube and with respect to an adapter and tip assembly.

48 Claims, 4 Drawing Sheets

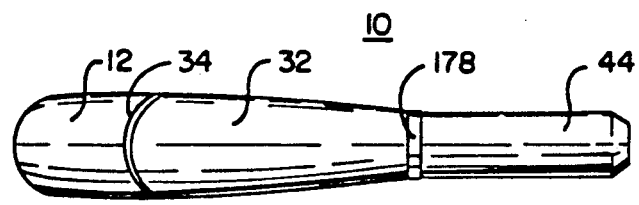
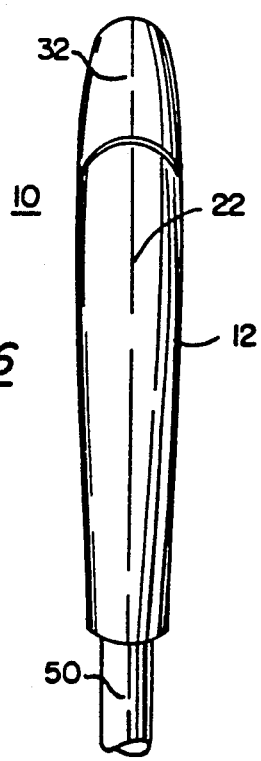
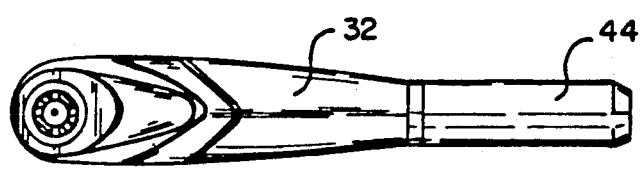
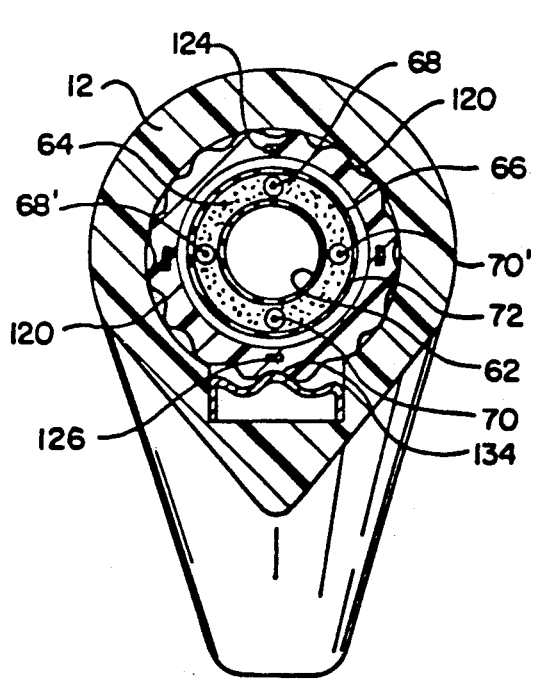
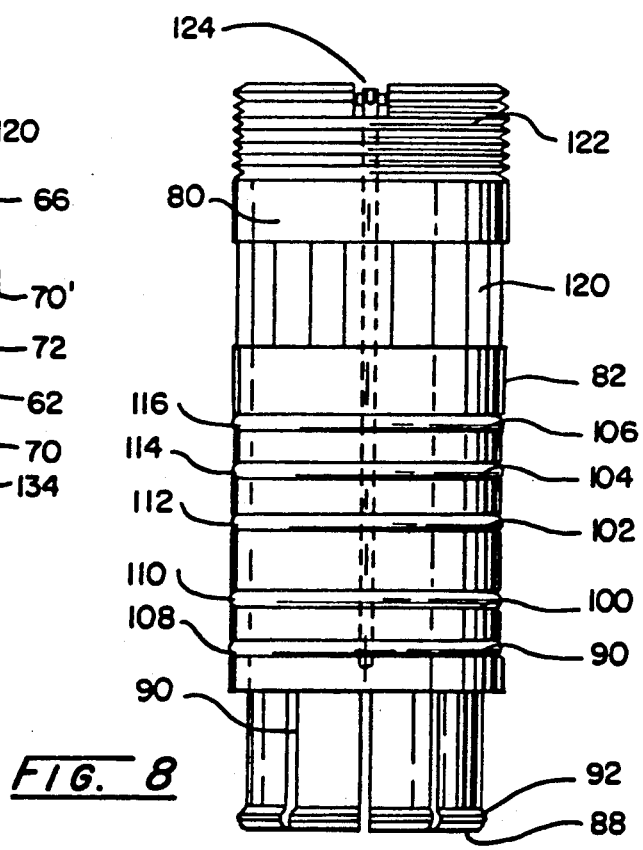

GUN FOR GAS METAL ARC WELDING

BACKGROUND OF THE INVENTION

Historically, a gas metal arc welding apparatus consisted principally of a welding machine which provided a source of an electric current to an electrical welding circuit. One side of the circuit was connected to a clamp, preferably spring loaded, which held a consumable metal wire electrode and was adapted to be held by an operator and the other side of the circuit was connected to the work piece to be welded. The outer surface of the electrode was covered with a flux which emitted an inert gas to prevent oxidation in the welding zone during the welding process when the electrode was heated. In operation the operator held the clamp and struck an arc between the electrode and the work piece to initiate the welding process. When the electrode was consumed the operator had to discontinue the welding process and insert another electrode into the clamp.

More recently, welding guns have been developed for use by operators as substitutes for the clamps having consumable electrodes which must be replaced frequently. Wire feeders used in conjunction with the welding guns provide a continuous source of consumable steel wire electrode to the welding gun. The wire electrode may pass from the feeder to the gun through a Bowden wire contained in a conduit connected to the welding gun. The conduit also may have a tube for providing a source of pressurized inert gas to the welding gun, a conductor for providing a current source from a welding machine to the gun and one or more pairs of control wires. A typical welding gun may have a handle with a switch connected to one or more pairs of control wires to enable the operator to operate a welding machine, a wire feeder and a gas solenoid to thereby control the feed of a wire electrode and the flow of gas to a work piece. Normally such a welding gun has an adapter with a contact tip at the front end of the gun through which the wire electrode exits to the work piece. This contact tip further functions to conduct current supplied by a welding machine to the electrode as the wire is fed through it. In most instances different sizes of contact tips may be attached to an adapter in order to accommodate different sizes of wire electrode. A nozzle attached to the adapter directs inert gas to the welding site.

Typically, a conduit which connects a welding gun to an electric current generating welding machine, a source of inert gas and a wire feeder is constructed as a concentric cable assembly. This assembly may have a resilient central gas tube, a multiple strand current transfer wire wound around the outer surface of the gas tube and at least one pair of control wire conductors entwined within the current transfer wire. A Bowden wire assembly for the wire electrode may be positioned within the gas tube. A resilient outer sheath overlies the outer surface of the current transfer wire and functions as an insulator.

One disadvantage of prior art welding machines resides in the fact that they are not ergonomically designed. As an example, in some machines the cable assembly is connected to the welding gun in such a fashion that the electrical connection for the current transfer cable is located at the rear end of the gun. This design necessitates the use of a strain relief at this end of the gun. With a strain relief the weight of a conduit containing the cable coming up to the gun from a floor is cantilevered outwardly some distance from the rear end of the gun. This results in a downwardly acting force some distance from the end of the gun which acts to make the front end of the gun pivot upwardly in the hand of an operator. Thus, the operator constantly must exert a counter rotating force on the gun during the entire time it is in his hand.

Additionally, the traditional welding gun design best accommodates a work piece positioned such that the operator can work with the welding gun above the piece with the contact tip at the front end of the gun from which the welding electrode emanates pointed downwardly. If a work piece or surface to be welded requires the contact tip of the gun to be rotated to either side of a vertically downwardly orientation the operator must twist his wrist in order to grip the welding gun handle properly. It has been learned that operators who utilize welding guns over a long period of time tend to exhibit some degree of carpal tunnel syndrome in the joint of the wrist which holds the welding gun. It has been surmised that the syndrome arises as a result of the strain exerted on the operator's wrist as he acts to counterbalance the torque exerted on the gun by the cable coming up from the floor to the strain relief at the rear of the gun and by the strain exerted on the wrist when he must rotate his wrist to angle the contact tip at the front of the gun to different angular positions. Some welding guns are constructed such that a head tube which carries the adapter and contact tip may be rotated to position the contact tip at different angles with respect to the front of the gun. However, in order to rotate the contact tip the connection to a current transfer wire must be loosened, the contact tip assembly rotated and the electrical connection again re-established. Such a procedure requires the use of tools and is time-consuming and inconvenient.

An additional disadvantage of traditional welding guns relates to the mechanical connection of the concentric cable assembly to the gun. One type of connection for the attachment of the current conducting cable to a head tube at the front end of the gun which conducts current to the adapter and contact tip assembly utilizes a conical connector threadably attached to a locking cone nut. The conical connector/cone nut connector requires that the end of the outer sheath of the conduit be stripped and removed to expose the wound multiple strand current transfer wire. This wire must be distributed evenly around the outer surface of the conical connection. Additionally, the ends of the multiple strand wire must be trimmed to the proper length to ensure that they do not interfere with the threaded portion of the connector and cone nut. Thereafter, the locking cone nut must be screwed onto the conical connector such that the current transfer wire strands are squeezed between the outer surface of the conical connector and the inner surface of the cone nut. Inasmuch as the conical connector/cone nut assembly is constructed from metal components the assembly must be insulated carefully as it conducts substantial amounts of current during the welding operation. Making the connection of the current transfer wire to the head tube in this manner requires a substantial period of time.

Another type of connection for the attachment of the current conducting cable to a head tube utilizes a brass connecting lug. In this assembly the metal head tube is inserted into an opening in the brass connecting lug and the gas tube from the concentric cable assembly is fed directly into the head tube. The outer sheath is stripped from the cable assembly and the multiple strands of current transfer wire are twisted together to form a pigtail which is inserted into the opening in the brass connecting lug parallel to and beneath the head tube. A plurality of set screws are threaded into the connecting lug above the head tube to bias the metal head tube against the current transfer wire such that the wire pigtail is squeezed between the head tube and the inner wall of the connecting lug. Because the brass connecting lug is made out of metal the lug must be completely insulated and care taken to ensure that the operator's hand does not contact the lug. This connection utilizes an expensive metal lug and requires a substantial amount of time to make because of the preparation involved.

The welding gun of the present invention overcomes many of the disadvantages inherent in the design of traditional welding guns. This welding gun has an ergonomic design which positions the connection of the concentric cable assembly to the head tube at the front end of the gun. The mechanical connection of the concentric cable assembly is made in such a way that the outer sheath of the cable is not disturbed. In fact, the outer sheath assists in making the electrical connection. Additionally, non-conductive, non-metallic elements are utilized to attach the head tube which conducts current to an adapter/contact tip assembly to the multiple strand current transfer wire. This connection greatly reduces the likelihood that an operator's hand will contact any of the components within the welding gun which are electrically charged during the welding operation.

Additionally, the welding gun of the instant invention has a handle which overlies the connection of the multiple strand current transfer wire to the head tube. This causes the weight of the cable assembly between the floor and the rear of the gun to be balanced by the head tube and an adapter/contact tip assembly at the front of the gun. Consequently, the operator does not have to continuously counterbalance a large downwardly acting force at the rear end of the gun. Additionally, the design of the welding gun of the present invention allows the handle of the gun to pivot freely with respect to the head tube and the adapter/contact tip assembly. Rotation of the handle with respect to this assembly may be accomplished at any time by the operator without disturbing any electrical connection and without disassembling any of the components of the gun. Thus, an operator readily may position the adapter/contact tip assembly of the gun at any desired angle with respect to the handle to position optimally the contact tip while allowing his hand to remain in the most comfortable position.

SUMMARY OF THE INVENTION

A welding gun for gas metal arc welding has a handle with a top surface, a bottom surface, or front end, a rear end and a longitudinally extending internal passageway which extends between the front end and the rear end. A gooseneck shaft having a longitudinal bore is rotatably mounted within the internal passageway of the handle to enable the handle to rotate about the outer surface of the gooseneck shaft. A gooseneck mounting and adapter and a contact tip at one end and having an internal head tube is attached to the gooseneck shaft.

DESCRIPTION OF THE DRAWINGS

FIG. 4 is a plan view of the front end of the welding gun;
FIG. 5 is a bottom view of the welding gun showing in cross-section the connection of a concentric cable assembly to the rear end of the gun;
FIG. 6 is a plan view of the rear end of the welding gun;
FIG. 7 is a cross-sectional view along line 7—7 of FIG. 9;
FIG. 8 is an enlarged view of the gooseneck shaft utilized in the welding gun.

DESCRIPTION OF THE PREFERRED EMBODIMENT

Figure 1:
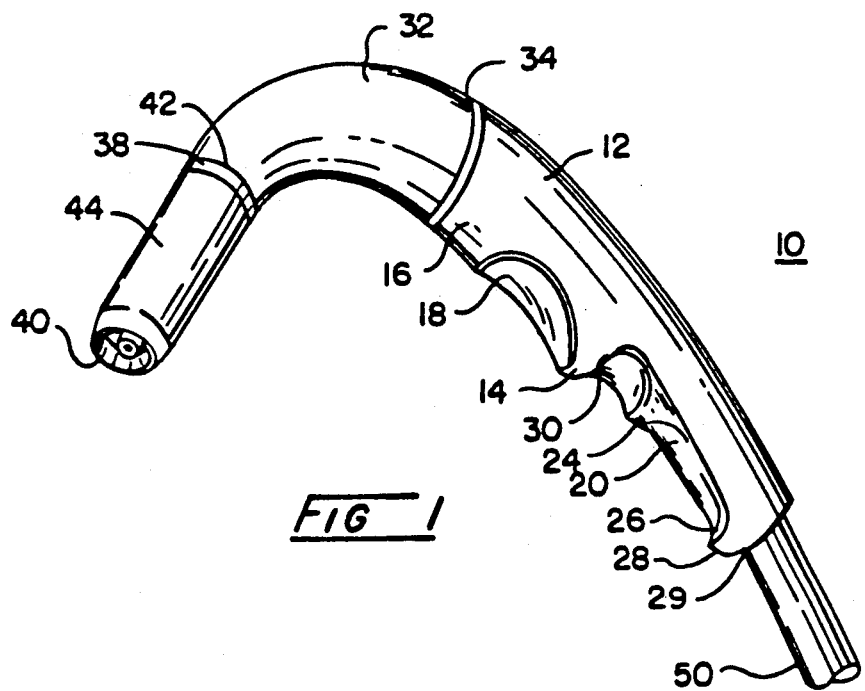
FIG. 1 is a perspective view of the assembled welding gun of the present invention.

Turning to FIGS. 1 through 6 of the drawings, it may be observed that the welding gun (10) of the present invention has a curved handle (12) adapted to be gripped by the hand of an operator. A centrally positioned trigger guard (14) projects from the bottom (16) of the handle (12). A trigger mask (18) which overlies a trigger (19) mounts in the bottom of handle (12) above trigger guard (14) and a detachable hand grip (20) fits into the bottom (16) of handle (12) below trigger guard (14). When an operator grasps the welding gun (10) in his hand, the palm of his hand rests on the top (22) of handle (12) such that his forefinger wraps around the trigger mask (18) and his thumb engages one side of trigger guard (14). The index finger of the operator's hand wraps around the detachable hand grip (20) between a protrusion (24) which projects outwardly from the hand grip (20) and the trigger guard (14). The ring and little fingers of the operator's hand wrap around the hand grip (20) between protrusion (24) and the rear end (29) of the handle (12). The curved handle (12), the detachable hand grip (20) and trigger mask (18) are manufactured from a non-conductive, heat insulative material such as glass filled nylon or plastic. Hand grip (20) fits into a cavity (26) formed in a protrusion (28) at the rear or inner end (29) of handle (12) and into a cavity (30) formed in trigger guard (14).

A curved gooseneck (32) also formed from a non-conductive, heat insulative material such as glass filled nylon or plastic has an enlarged inner end (34) which connects to the outer end (36) of handle (12). Gooseneck (32) contains a head tube (86) which projects into handle (12). A tip adapter (38) which mounts a contact tip (40) and will be explained in more detail hereinbelow threadably engages the outer end (42) of curved gooseneck (32). A metal nozzle (44) overlies adapter (38).

Figure 2:
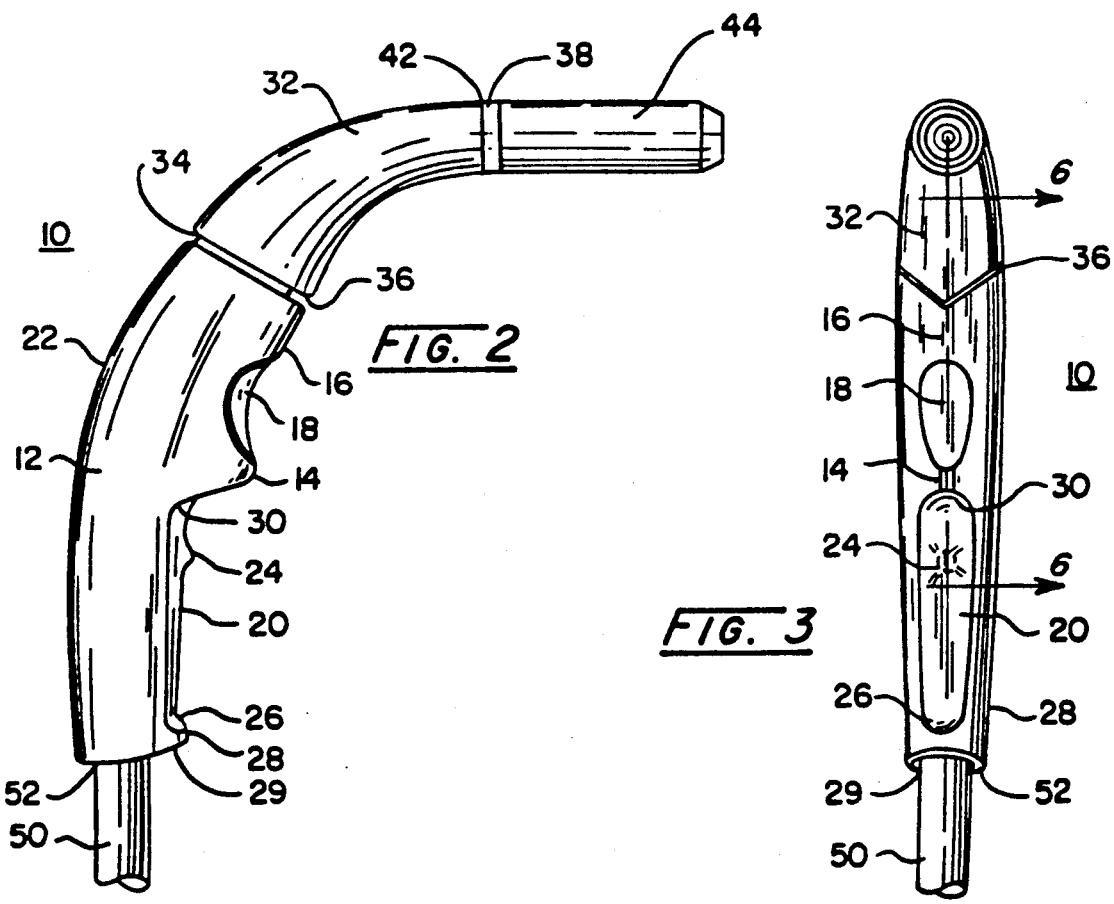
FIG. 2 is a side view of the welding gun.
Figure 3:
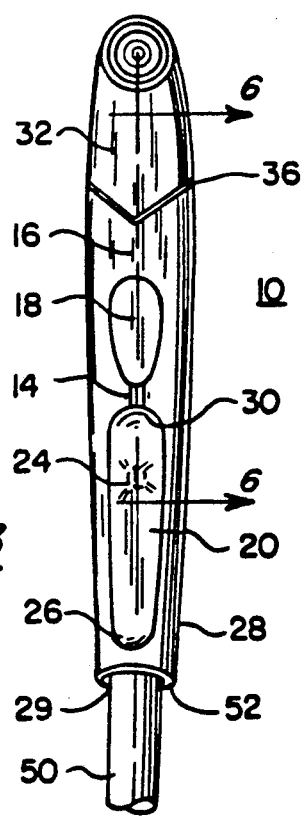
FIG. 3 is a bottom view of the welding gun.
Figure 9:
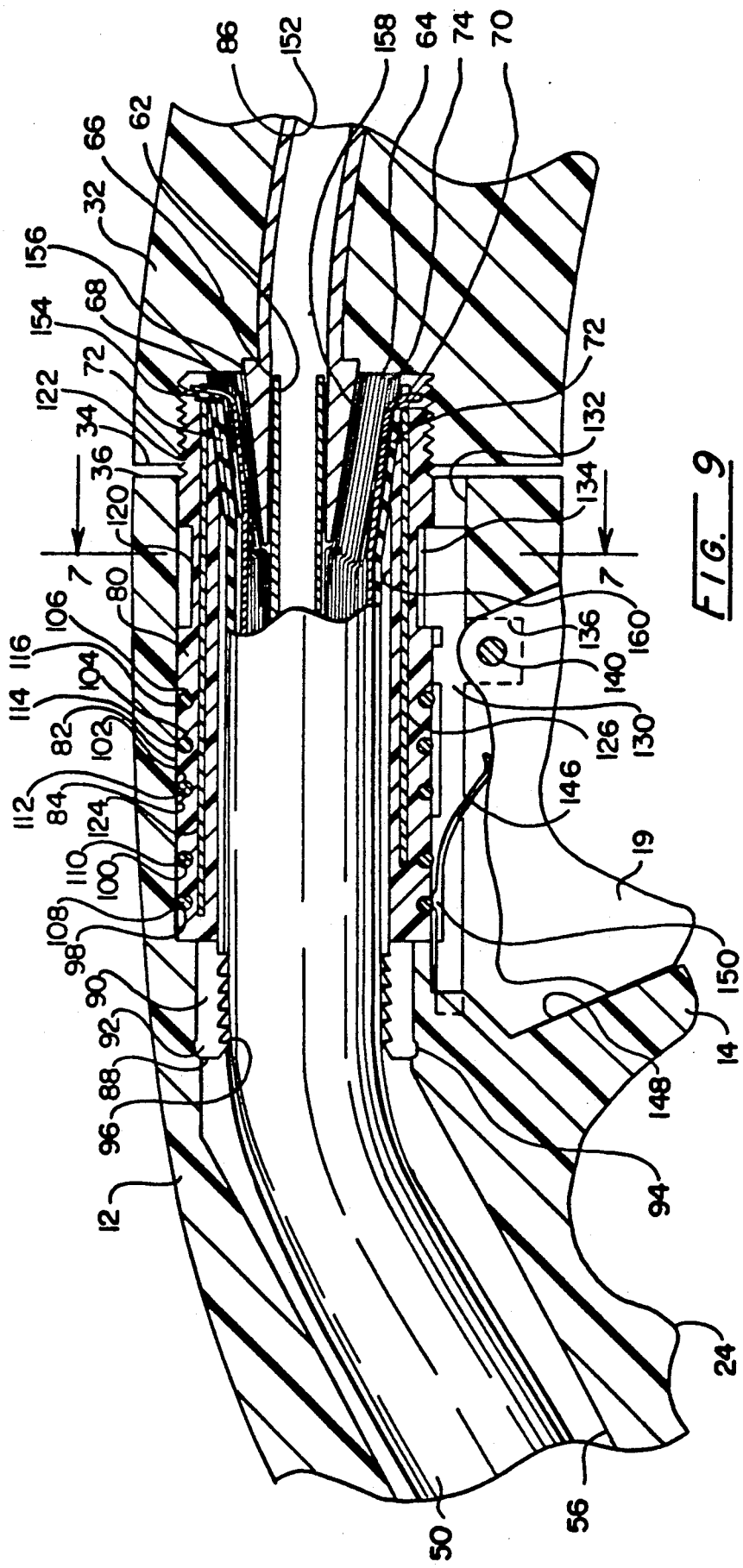
FIG. 9 is an enlarged sectional view of the connection of the concentric cable assembly to the head tube of the welding gun.

Turning to FIG. 2 of the drawings, it may be observed that a conduit (50) enters curved handle (12) through a central opening (52) defined in the inner end (29) thereof. With the curved design of the body of welding gun (10) which includes curved handle (12) and curved gooseneck (32), the force of conduit (50) acting downwardly on the inner end (29) of handle (12) has been minimized. Additionally, the connection of conduit (50) to the head tube (86) contained within gooseneck (32) occurs within handle (12) at the outer end thereof as illustrated in FIG. 9. This construction causes the downwardly acting force of cable (50) acting on the inner end (29) of handle (12) and on the hand of an operator gripping the handle (12) to be counter balanced by a downwardly acting force on the outer end (36) of the handle (12) exerted by the weight of gooseneck (32), tip adapter (38) and nozzle (44). Additionally, the detachable hand grip (20) mounted in handle (12) provides an ergonomically designed welding gun handle which may be held comfortably by operators having different sized hands.

Conduit (50) which enters welding gun (10) through an opening (52) at the inner end (29) of handle (12) passes through a circular, axial, inner passage (56) formed on the inside of handle (12). The construction details of conduit (50) may be observed by referring to FIG. 7. A circular gas tube (62) which may be made of an elastomeric material forms the core of the conduit (50). Gas tube (62) provides a passage for an inert gas under pressure supplied from a source remote to welding gun (10). Although not shown, a Bowden wire assembly consisting essentially of a fixed helically wound wire sheath defining a passage way for a steel welding electrode typically resides within gas tube (62) to provide a continuous source of consumable wire electrode from a wire feeder located at a location remote from welding gun (12) to the contact tip (40). A multiple strand current transfer wire (64) overlies the outer surface (66) of gas tube (62). Current transfer wire (64) may be wound in a helix around outer surface (66). Additionally, a plurality of control wire conductors (68 and 70) and (68' and 70') may be entwined within current transfer wire (64). The control wire conductors (68, 68', 70 and 70') have insulating jackets to ensure that no electrical contact will be established between them and current transfer wire (64). The current transfer wire (64) functions to transfer electrical current generated from a welding machine located at a location remote from welding gun (10) to a head tube and an adapter and contact tip assembly and to a consumable wire electrode. The control wire conductors (68, 68', 70 and 70') function to complete a circuit between one or more switches contained within handle (12) and equipment such as a wire feeder, a solenoid for an inert gas source and/or a control for a welding machine located remote from welding gun (10). Such equipment is well known and is not shown in the drawings. An insulative, resilient outer sheath (72) fits tightly over the outer surface (74) of current transfer wire (64). Outer sheath (72) preferably is constructed of a heavy material which may be neoprene or a similar elastomeric material and which must be capable of withstanding heavy abrasion caused by dragging the conduit, resistant to stretching or breaking caused by pulling the conduit, capable of withstanding cuts and tears when the conduit engages sharp objects and capable of resisting water, grease, etc. commonly found in a shop environment.

As mentioned previously, the welding gun (10) of the present invention functions to provide a consumable metal wire welding electrode to the welding site. Additionally, the welding gun must be capable of supplying a high electrical current to the wire electrode to enable the welding operation. Preferably, the welding gun also should be capable of providing a source of inert gas to the welding site. Lastly, the welding gun should have a control mechanism for operating a wire feeder, a welding machine and/or a source of pressurized inert gas located at a site remote from that of the welding gun. The internal components of the welding gun (10) of the present invention which enable it to function as desired may be seen best by referring to FIGS. 9 and 10.

A gooseneck shaft (80) is received within the outer end (36) of handle (12). The outer surface (82) of gooseneck shaft (80) is received within a complementary shaped inner surface (84) formed within the outer end (36) of handle (12). Gooseneck shaft (80) has a plurality of functions. Shaft (80) functions to grip conduit (50) to anchor it firmly in place within handle (12), it functions to enable handle (12) to be rotated about the axis of shaft (80) with respect to gooseneck body (32) and conduit (50), it functions to retain handle (12) in a set angular position, it functions to connect multi-strand current transfer wire (64) to the metal head tube (86) in gooseneck body (32) and it functions to enable a switch mechanism which will connect one or more pairs of control wire conductors (68, 68', 70 and 70') to control a welding machine, wire feeder and/or pressurized gas source as mentioned above. Gooseneck shaft (80) illustrated in detail in FIG. 8, is a unitary, generally cylindrical element made out of a non-conductive insulative material such as nylon or plastic. One end (88) of shaft (80) has a plurality of longitudinally extending fingers (90) each having an arcuate shoulder (92). The shoulders (92) are adapted to snap into a circular recess (94) formed in handle inner surface (84). Each of the shoulders (92) has a toothed gripping surface (96) formed on the inner surface thereof adapted to engage the sheath (72) on outer surface of conduit (50) when the shaft (80) has been positioned within handle (12).

The outer surface (82) of gooseneck shaft (80) has a plurality of concentric longitudinally spaced circumferential grooves (98, 100, 102, 104 and 106) shown in FIGS. 8 and 9. A plurality of metallic switch contact rings (108 through 116) are seated within these grooves. A plurality of equally spaced longitudinally extending detent grooves (120) are formed in the outer surface (82) of gooseneck shaft (80). Additionally, the outer surface (82) at the head end (122) of shaft (80) remote from the fingers (90) is threaded. Lastly, a plurality of metallic conductors (124 and 126) of which two are shown extend longitudinally through the body of gooseneck shaft (80) from the head end (122) thereof and engage switch contact rings (108 and 110) which reside within grooves (98 and 100). Conductors (124 and 126) may be connected to other conductors, not shown, by also being connected to one or more contact rings (112 through 116). Consequently, if switch contact rings (108 and 110) are connected electrically by a conductor the flat metal conductors (124 and 126) are connected electrically. It should be noted that circular contacts could be plated onto the outer surface (82) of shaft (80) in place of the contact rings (108 through 116) shown. Also longitudinally extending conductors plated onto the outer surface (82) of shaft (80) could be utilized in place of the metal conductors (124 and 126).

Turning to FIG. 9, it may be observed that when gooseneck shaft (80) has been seated within the inner surface (84) of handle (80) and the fingers (90) of shaft (80) engage the outer sheath (72) of conduit (50) there is nothing to prevent handle (12) from rotating with respect to gooseneck shaft (80). In fact, handle (12) may rotate freely about the outer surface of gooseneck shaft (80) while gooseneck body (32) remains rigidly affixed to one end thereof. As a result, handle (12) may be rotated with respect to conduit (50) and adapter (38) to enable an operator to position his hand at any angle with respect to adapter (38) and contact tip (40) during the welding operation.

Figure 10:
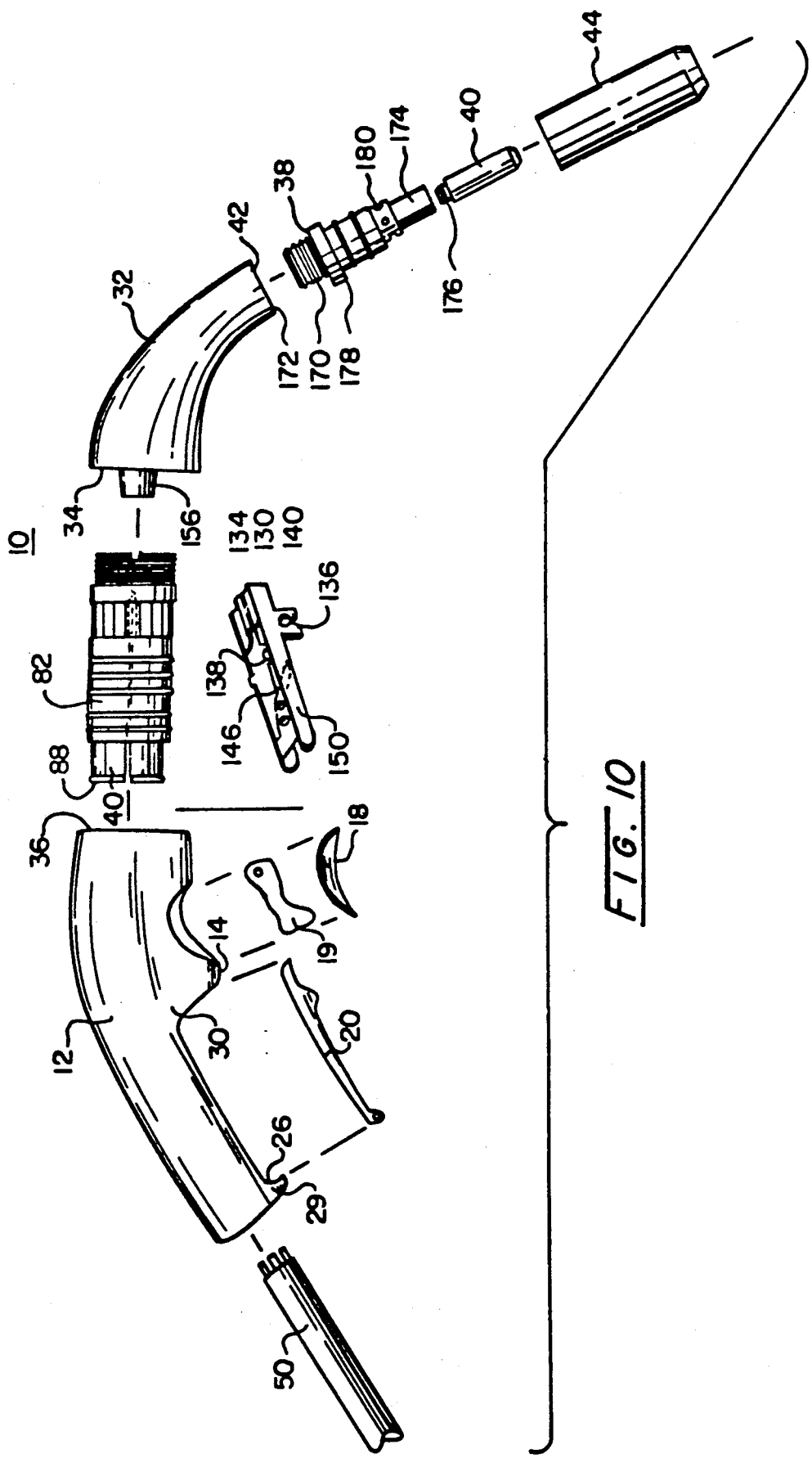
FIG. 10 is an exploded view of the welding gun.

A stamped metal trigger spring detent (130) shown in FIGS. 9 and 10 is positioned within a longitudinally extending groove (132) formed within handle (112) adjacent the outer end (36) thereof and rotates with handle (12). Trigger spring detent (130) functions to provide a detent element for retaining handle (12) in a set angular position with respect to gooseneck shaft (80), to provide a metal conductor element adapted to connect electrically a pair of switch contact rings (108 and 110), to provide a pivot for the trigger (19) and to provide a spring return for the trigger (19). Trigger spring detent (130) has a longitudinal shoulder (134) at the fore end thereof adapted to be seated within one of the detent grooves (120) formed in the outer surface of gooseneck shaft (80). Shoulder (134) cooperates with one of the detent grooves (120) to retain handle (12) in a set angular position with respect to shaft (80). Trigger spring detent (130) also has a pair of downwardly depending legs (136 and 138). Legs (136 and 138) have holes formed therein to enable them to receive laterally extending pivot pins (140), only one of which is shown, formed on either side of a trigger (19). Thus, trigger spring detent (130) pivotally mounts trigger (19). The trigger spring detent (130) has a downwardly depending trigger spring (146) located centrally thereof. Spring (146) functions to pivot trigger (19) counterclockwise such that trigger (19) rests against a wall (148) defined in handle (12) when the trigger (19) is not actuated.

It may be observed that one end (150) of trigger spring (146) contacts one switch contact ring (108) at all times. When trigger (19) is released and in the rest position illustrated in FIG. 9, spring (146) does not contact any other switch contact ring. However, when trigger (19) is squeezed by an operator such that it rotates clockwise about pivot pins (140), trigger spring (146) is moved into contact with switch contact ring (110). This movement establishes an electrical connection between switch contact rings (108 and 110) which in turn establishes an electrical connection between conductors (124 and 126). In this manner control wires (68 and 70) housed within conduit (50) are electrically connected to thereby operate, directly or indirectly controls for, a welding machine, a wire feeding machine and/or a source of pressurized inert gas not shown. Other pairs of control wires (68' and 70') may be connected to other conductors, not shown, within gooseneck shaft (80) which may be connected to additional pairs of switch contact rings (112 through 116) through an additional switch on handle (12) to operate these or other devices at remote locations.

It may be observed in FIG. 9 that gas tube (62) in conduit (50) extends into the cylindrical inner surface (152) of metal head tube (86). As mentioned previously, head tube (86) resides within non-conducting gooseneck body (32). In fact, head tube (86) may be cast within gooseneck body (32).

It may be seen that gooseneck body (32) has a threaded bore (154) which threadably engages the threaded head end (122) of gooseneck shaft (80). Additionally, head tube (86) has a tapered outer surface (156) which engages the inner surface (158) of the current transfer wire (64) when gooseneck body (32) is joined to gooseneck shaft (80). As the threaded connection between gooseneck body (32) and gooseneck shaft (80) is tightened, the tapered outer surface (156) of head tube (86) squeezes current transfer wire (64) against outer sheath (72). Outer sheath (72) is restrained from radial movement by being biased against the inner surface (160) of gooseneck shaft (80). It may be appreciated that the tapered outer surface (156) of head tube (86) cooperates with gooseneck shaft (80) to provide a simple tight connection between current transfer wire (64) and head tube (86). This connection requires only that the outer end of conduit (50) have a straight lateral cut. Outer sheath (72) does not have to be cut or peeled, current transfer wire (64) does not have to be braided or moved in any manner and the control wire conductors (68, 68', 70 and 70') may be connected easily to the conductors (124 and 126) in gooseneck shaft (80).

From the above, it may be seen that control handle (12) and gooseneck body (32) cooperate to provide the electrical connection between the current transfer wire (64) and head tube (86). Additionally, these elements connect the gas tube (62) to the inner surface (158) of head tube (86). Although not shown, a wire electrode which may be contained within a Bowden wire assembly also would project through inner surface (152) of head tube (86).

The adapter, tip and nozzle attached to gooseneck body (32) may be seen by referring to FIG. 10. A metal tip adapter (38) has a threaded end (170) adapted to be received within a threaded outer end (172) of head tube (86). This establishes an electrical connection between head tube (86) and adapter (38). Adapter (38) has an internally threaded end (174) which receives the threaded end (176) of contact tip (40). In this manner the current transfer wire (64) is connected with the contact tip (40). An insulator (178) overlies the outer surface of adapter (38). A tubular nozzle (44), which may be metallic, is pushed onto the outer surface of the insulator (178). Adapter (38) has a plurality of openings (180) to the inner bore thereof adjacent the internally threaded end (174) thereof. Thus, inert gas under pressure leaves adapter (38) at the base of contact tip (40). Nozzle (44) functions to direct the inert gas to the outer end of contact tip (40) to ensure that the interface between the contact tip and a work piece are surrounded by inert gas during the welding process.

Since certain changes may be made in the above-described system and apparatus without departing from the scope of the invention herein involved, it is intended that all matter contained in the description or shown in the accompany drawings shall be interpreted as illustrative and not in a limiting sense.

We claim:

1. A welding gun for metal arc welding which comprises:

a handle having a top surface, a bottom surface, a front end, a rear end and a longitudinally extending internal passageway which extends between said front end and said rear end and adapted to receive one end of a flexible, coaxial conduit having a resilient outer sheath which encloses a flexible gas tube, a current transfer wire and a pair of control wires;

a rigid, cylindrical, non-conductive gooseneck shaft having a longitudinal bore which receives said flexible coaxial conduit rotatably mounted within the internal passageway of said handle adjacent said front end to enable said handle to rotate freely about the outer surface of said gooseneck shaft and said flexible coaxial conduit;

a gooseneck having an electrically conductive internal head tube: and attaching means for attaching said gooseneck to said gooseneck shaft such that said head tube is connected electrically to said current transfer wire.

2. The welding gun of claim 1 further comprising:

retaining means mounted in said handle between said inner wall and said outer surface of said gooseneck shaft which engages said gooseneck shaft for retaining said handle in a set angular position with respect to said gooseneck shaft when said handle is rotated.

3. The welding gun of claim 2 in which:

said gooseneck shaft has a circumferential groove containing a plurality of longitudinally extending ribs on its outer surface which engages said retaining means.

4. The welding gun of claim 1 in which:

said handle has a curved shape such that the axis of said internal passageway is curved.

5. The welding gun of claim 1 which comprises:

a removable hand grip detachably mounted in said handle.

6. The welding gun of claim 1 in which:

said handle is a unitary molded element constructed from an insulative material.

7. The welding gun of claim 1 which comprises:

locating means on said gooseneck shaft which cooperate with said handle for locating said gooseneck shaft longitudinally within said handle.

8. The welding gun of claim 7 which comprises:

a circumferential groove formed in the internal passageway of said handle which cooperates with said locating means for locating said gooseneck shaft in said handle.

9. The welding gun of claim 1 further comprising:

grip means in said gooseneck shaft for gripping the outer sheath of said conduit in said gooseneck shaft.

10. The welding gun of claim 9 in which:

said grip means comprises a plurality of individual resilient fingers.

11. The welding gun of claim 1 in which:

said one end of said head tube has a tapered annular outer surface which projects into the bore in said gooseneck shaft; and wherein said head tube outer surface engages the inner surface of said current transfer wire contained within said conduit and compresses said current transfer wire between said head tube outer surface and said outer sheath; and said outer sheath being supported to resist compression by the inner surface of said gooseneck shaft when said gooseneck is attached to said gooseneck shaft.

12. The welding gun of claim 1 which comprises:

a nozzle mounted on the outer surface of said connecting means.

13. The welding gun of claim 1 in which:

said handle has a trigger mounted in the bottom surface of said handle adjacent said front end, a trigger guard formed in the bottom surface of said handle between said rear end and said trigger, and wherein the handle tapers downwardly from said trigger guard towards said rear end to enable the smaller two fingers of an operator's hand to encircle the handle comfortably.

14. The welding gun of claim 1 in which:

said handle has a trigger mounted in the bottom surface of said handle adjacent said front end, a trigger guard formed in the bottom surface of said handle between said rear end and said trigger, and wherein the handle has an arcuate shape to cause a conduit carrying a welding current conductor to emerge from the rear end of said handle substantially perpendicular to a floor during the welding operation in which a workpiece is in a horizontal position.

15. The welding gun of claim 1 in which said attaching means is a threaded connection.

16. The welding gun of claim 1 further comprising:

an annulus formed on the outer surface of said gooseneck shaft; and said handle rotates about said annulus.

17. The welding gun of claim 1 in which said gooseneck body is constructed from an insulative material.

18. A welding gun for gas metal arc welding which comprises:

a handle having a top surface, a bottom surface, a front end, a rear end and a longitudinally extending internal passageway which extends between said front end and said rear end;

a gooseneck shaft rotatably mounted within the internal passageway of said handle to enable said handle to rotate about the outer surface of said gooseneck shaft and having a longitudinal bore;

a gooseneck having an internal head tube;

a contact tip;

connecting means for connecting said contact tip to said head tube;

attaching means for attaching said gooseneck to said gooseneck shaft;

grip means in said gooseneck shaft for gripping the outer surface of a conduit from a welding machine which passes through said internal passageway in said handle and through said bore in said gooseneck shaft;

said grip means comprises a plurality of individual resilient fingers; and each of said resilient fingers has a toothed surface which engages said conduit outer surface.

19. The welding gun of claim 18 which comprises:

a plurality of circular conductors on the outer surface of said gooseneck shaft:

an electrically conductive control element mounted on said gooseneck shaft connected to each of said circular conductors;

second connecting means mounted in and rotatable with said handle for electrically connecting two of said circular conductors; and wherein said second connecting means is movable between a first position in which said two circular conductors are connected and a second position in which said two circular conductors are electrically disconnected.

20. The welding gun of claim 19 which comprises:

a trigger mounted pivotally in said handle and adapted to be moved into engagement with said second connecting means by an operator to thereby move said second connecting means to said first position.

21. The welding gun of claim 20 which comprises:

a trigger mask mounted in said handle such that it overlies said trigger and wherein said mask is made of a resilient material.

22. The welding gun of claim 19 in which:

said circular conductors are formed from metal coil springs.

23. The welding gun of claim 19 in which:
said circular conductors are plated onto the outer surface of said gooseneck shaft.

24. The welding gun of claim 19 in which:
each of said control elements connects to an insulated electric wire which extends to a control device remote from said welding gun.

25. A welding gun for metal arc welding which comprises:
a handle having a top surface, a bottom surface, a front end, a rear end and an inner wall which defines a longitudinally extending internal passageway which extends between the front end and the rear end adapted to receive one end of a flexible, coaxial conduit having an outer sheath which encompasses a central flexible gas tube, a current transfer wire wound around the outer surface of the gas tube and a pair of control wires;
a rigid non-conductive gooseneck shaft mounted within said handle having a bore with an inner wall which overlies said conduit, and one end which projects from the outer end of the handle;
a gooseneck body having a handle end and a nozzle end which overlies the outer surface of a longitudinally extending, electrically conductive head tube with a longitudinal bore formed therein and one end adapted to connect to the current transfer wire;
wherein said one end of said head tube projects from said handle end of said gooseneck body into the inner bore of said gooseneck shaft; and
coupling means for rigidly coupling said handle end of said gooseneck body to said one end of said gooseneck shaft such that said head tube enters said conduit between said gas tube and said current transfer wire and squeezes said wire between said head tube outer surface and outer sheath, said outer sheath being supported to resist said compression by said inner wall of said gooseneck shaft to thereby establish an electrical connection between said current transfer wire and said head tube.

26. The welding gun of claim 25 in which said gooseneck shaft is cylindrical, has an outer surface which complements a portion of the inner wall of said handle and is mounted rotatably within said handle; and said handle rotates freely about the outer surface of said gooseneck shaft and said coaxial conduit.

27. In a welding gun for metal arc welding, said gun being connected to a welding machine by a flexible conduit which includes a flexible gas tube, a multi-strand current transfer wire braided or wound around the gas tube, an outer resilient sheath of insulating material surrounding the current transfer wire, and a pair of insulated control wires embedded in and coextending lengthwise with the multi-strand current transfer wire, the combination comprising:
a gooseneck body member;
annular projecting means carried by said gooseneck body member and extending in the distal direction from the proximal end of said gooseneck body member,
a gooseneck shaft or extension having inner annular wall means of a diameter or diameters sufficient to receive said outer sheath of said flexible conduit,
means for retaining said flexible conduit within said gooseneck shaft or extension with said flexible conduit extending from the welding machine into the proximal end of said gooseneck shaft or extension and internally along the length thereof and terminatable at a straight lateral cut of said flexible conduit at the distal end of the gooseneck shaft or extension,
and mechanical coupling means for rigidly fixing the distal end of said gooseneck shaft or extension to the proximal end of said gooseneck body member with said annular projecting means projecting into the distal end of said gooseneck shaft or extension, said annular projecting means being of electrically conducting material and being shaped to project between the outside of said flexible gas tube and said multi-strand current transfer wire, said coupling means including means to increase the degree of said projection of said conductive annular projecting means into the distal end of said gooseneck shaft or extension as the connection is tightened, said conductive annular projecting means being further shaped to wedgingly compress the strands of said multi-strand current transfer wire between said annular projecting means and said outer sheath of said flexible conduit as said degree of projection increases with said tightening of said coupling means to thereby establish electrical connection between said multi-strand current transfer wire and said conductive annular projecting means, said sheath being supported against said compressing action by said inner annular wall means of said gooseneck shaft or extension.

28. The welding gun of claim 27 further comprising:
said gooseneck shaft or extension being of dielectric material, electrical leads carried within the walls of said gooseneck shaft or extension, said leads projecting forwardly or distally from the distal end of said gooseneck shaft or extension whereby the distal ends of said insulated control wires of said flexible conduit may be easily stripped and connected to said electrical leads prior to the interengagement and tightening-down of said coupling means.

29. The welding gun of claim 28 further comprising:
a handle body surrounding said gooseneck shaft or extension, control switch means carried by said handle body, and electrical connection means between said gooseneck shaft or extension and said handle body for connecting said electrical leads to said control switch means.

30. The welding gun of claim 29 further comprising:
said gooseneck shaft or extension being of generally cylindrical shape, said handle body being rotatable with respect to said gooseneck shaft or extension, said electrical connection means comprising slip ring means.

31. In a welding gun for metal arc welding, said gun being connected to a welding machine by a flexible conduit which includes a flexible gas tube of a given outside tube diameter, a multi-strand current transfer wire braided or wound around the gas tube, an outer resilient sheath of insulating material surrounding the current transfer wire, and a pair of insulated control wires embedded in and coextending lengthwise with the multi-strand current transfer wire, the combination comprising:
a gooseneck body member;
a head tube contained within said gooseneck body member and extending in the distal direction from the proximal end of said gooseneck body member, the proximal end of said head tube terminating in an end annulus having a tapered outer surface and having an inner diameter slightly greater than said given outside tube diameter;

a gooseneck shaft or extension having inner annular wall means of a diameter or diameters sufficient to receive said outer sheath of said flexible conduit;

means for retaining said flexible conduit within said gooseneck shaft or extension with said flexible conduit extending from the welding machine into the proximal end of said gooseneck shaft or extension and internally along the length thereof and terminatable at a straight lateral cut of said flexible conduit at the distal end of the gooseneck shaft or extension; and mechanical coupling means for rigidly fixing the distal end of said gooseneck shaft or extension to the proximal end of said gooseneck body member with said end annulus projecting into the distal end of said gooseneck shaft or extension and projecting between the outside of said flexible gas tube and said multi-strand current transfer wire, said coupling means including means to increase the degree of said projection of said annulus into the distal end of said gooseneck shaft or extension as the coupling is tightened whereby said tapered outer surface of said annulus acts to compress the strands of said multi-strand current transfer wire between said annulus and said outer sheath of said flexible conduit to establish electrical connection of said multi-strand current transfer wire and said head tube, said sheath being supported against said compressing action by said inner annular wall means of said gooseneck shaft or extension.

32. The welding gun of claim 31 further comprising: said gooseneck shaft or extension being of dielectric material, electrical leads carried within the walls of said gooseneck shaft or extension, said leads projecting forwardly or distally from the distal end of said gooseneck shaft or extension whereby the distal ends of said insulated control wires of said flexible conduit may be easily stripped and connected to said electrical leads prior to the interengagement and tightening-down of said coupling means.

33. The welding gun of claim 32 further comprising: a handle body surrounding said gooseneck shaft or extension, control witch means carried by said handle body, and electrical connection means between said gooseneck shaft or extension and said handle body for connecting said electrical leads to said control switch means.

34. The welding gun of claim 33 further comprising: said gooseneck shaft or extension being of generally cylindrical shape, said handle body being rotatable with respect to said gooseneck shaft or extension, said electrical connection means comprising slip ring means.

35. In a welding gun for metal arc welding, said gun being connected to a welding machine by a flexible conduit having gas, welding current and control wire means therein all contained within a flexible outer sheath, the combination comprising:

a gooseneck body member;

a gooseneck shaft or extension of generally cylindrical shape and having inner annular wall means of a diameter or diameters sufficient to receive said outer sheath of said flexible conduit;

means for fixedly retaining said flexible conduit within said gooseneck shaft or extension with said flexible conduit extending from the welding machine into the proximal end of said gooseneck shaft or extension and internally along the length thereof to the distal end thereof;

coupling means for rigidly fixing the distal end of said gooseneck shaft or extension to the proximal end of said gooseneck body member with welding current and gas connections established between said flexible conduit and elements associated with said gooseneck body member;

a handle body surrounding said gooseneck shaft or extension and mounted thereon for relative rotating movement; and snap-detent means between said handle and said gooseneck shaft or extension, said detent means defining multiple snap positions distributed around an arcuate range of relative rotative positions of the parts, said handle being adjustably movable from one to the other of any two of said snap positions solely by manually imposed twisting forces sufficient to snap said snap-detent means from one to the other position and without prior loosening or tightening adjustments to allow said adjusting movement.

36. The welding gun of claim 35 in which said arcuate range of relative rotative positions encompasses 360 degrees.

37. In a welding gun for metal arc welding, said gun being connected to a welding machine by a flexible conduit having gas, welding current and control wire means therein all contained within a flexible outer sheath, the combination comprising:

a gooseneck body member;

a gooseneck shaft or extension of generally cylindrical shape and having inner annular wall means of a diameter or diameters sufficient to receive said outer sheath of said flexible conduit;

means for fixedly retaining said flexible conduit within said gooseneck shaft or extension with said flexible conduit extending from the welding machine into the proximal end of said gooseneck shaft or extension and internally along the length thereof to the distal end thereof;

connecting means for rigidly fixing the distal end of said gooseneck shaft or extension to the proximal end of said gooseneck body member with welding current and gas connections established between said flexible conduit and elements associated with said gooseneck body member;

a handle body surrounding said gooseneck shaft or extension and curvedly extending beyond the latter in the proximal direction in loosely surrounding relationship with the portion of said flexible conduit immediately adjacent but outside the proximal end of said gooseneck shaft or extension, said handle together with its curved extension being rotatable on said gooseneck shaft or extension from one adjusted position to another, said loosely surrounding relationship between said curved handle extension and said flexible conduit accommodating twisting or bending of the latter relative to said curved handle extension as necessary to accommodate said rotation of said curved handle extension relative to said gooseneck shaft or extension despite said fixed retaining of said flexible conduit within said gooseneck shaft or extension.

38. Connection means in a welding gun for metal arc welding, said gun being connected to a welding machine by a flexible conduit which includes a flexible gas tube, a multi-strand current transfer wire braided or wound around the gas tube, and an outer resilient sheath of insulating material surrounding the current transfer wire, said conduit being terminated at the gun for connection to gun elements by a straight lateral cut from one side of the sheath diameter to the other, said connection means comprising:

a hollow longitudinal body member forming part of said welding gun and having longitudinally extending mean for conducting gas and welding current received from said flexible conduit;

annular projecting means carried by said body member and extending in the distal direction from the proximal end of said body member;

a body member extension having inner annular wall means of a diameter or diameters sufficient to receive said outer sheath of said flexible conduit;

means for retaining said flexible conduit within said body member extension with said straight lateral cut termination of said conduit positioned at the distal end of said body member projection; and mechanical coupling means for rigidly fixing the distal end of said body member extension to the proximal end of said body member with said annular projecting means projecting into the distal end of said body member extension, said annular projecting means being of electrically conducting material and being shaped to project past the plane of said straight lateral cut and to slip radially outside of and in surrounding relation with said flexible gas tube and radially within and in surrounded and directly contacting relation with the radially innermost of the strands of said multi-strand current transfer wire as said body member and said body member extension are brought together for coupling, said coupling means including means to increase the degree of said projection of said conductive annular projecting means into the distal end of said body member extension as the connection is tightened, and said annular projecting means being further shaped to radially outwardly wedge said strands as said degree of projection increases with said tightening of said coupling means, rigid annular means radially displaced from said annular projecting means for resisting said radially outward wedging of said strands of said multi-strand current wire whereby said outward wedging establishes compression forces between said strands and said annular projecting means to thereby establish good electrical connection between aid multi-strand current transfer wire and said conductive annular projecting means as said coupling means is tightened down.

39. Connection means as in claim 38 in which said compression forces being applied around the annular extents of said annular projecting means and said multi-strand current wire whereby said electrical connection between said elements extends around said annular extents.

40. Connection means as in claim 38 further comprising: said flexible conduit also containing a pair of insulated control wires embedded in and coextending lengthwise with the multi-strand current transfer wire of the flexible conduit, said body member extension being of dielectric material, electrical leads carried within the walls of said body member extension, said leads projecting forwardly or distally from the distal end of said body member extension whereby the distal ends of said insulated control wires of said flexible conduit may be easily stripped and connected to said electrical leads prior to the interengagement and tightening-down of said coupling means.

41. Connection means as in claim 40 further comprising: a handle body surrounding said body member extension, control switch means carried by said handle body, and electrical connection means between said body member extension and said handle body for connecting said electrical leads to said control switch means.

42. Connection means as in claim 41 further comprising: said body member extension being of generally cylindrical shape, said handle body being rotatable with respect to said body member extension, said electrical connection means comprising slip ring means.

43. Connection means in a welding gun for metal arc welding, said gun being connected to a welding machine by a flexible conduit which includes a flexible gas tube, a multi-strand current transfer wire braided or wound around the gas tube, and an outer resilient sheath of insulating material surrounding the current transfer wire, said conduit being terminated at the gun for connection to gun elements by a straight lateral cut from one side of the sheath diameter to the other, said connection means comprising:

a hollow longitudinal body member forming part of said welding gun and having longitudinally extending means for conducting gas and welding current received from said flexible conduit;

annular projecting means carried by said body member and extending in the distal direction from the proximal end of said body member;

a body member extension having inner annular wall means of a diameter or diameters sufficient to receive said outer sheath of said flexible conduit;

means for retaining said flexible conduit within said body member extension with said straight lateral cut termination of said conduit positioned at the distal end of said body member projection; and mechanical coupling means for rigidly fixing the distal end of said body member extension to the proximal end of said body member with said annular projecting means projecting into the distal end of said body member extension, said annular projecting means being of electrically conducting material and being shaped to project past the plane of said straight lateral cut and to slip into overlapping annularly coextensive, and directly contacting relation with said multi-strand current transfer wire as said body member and said body member extension are brought together for coupling, said coupling means including means to increase the degree of said projection of said conductive annular projecting means into the distal end of said body member extension as the connection is tightened, and said annular projecting means being further shaped to radially wedge said multi-strand current transfer wire as said degree of projection increases with said tightening of said coupling means, means radially displaced from said annular projecting means for resisting said radial wedging of said multi-strand current transfer wire whereby said wedging establishes compression forces between said multi-strand current transfer wire and said annular projecting means to thereby establish good electrical connection between said multi-strand current transfer wire and said conductive annular projecting means as said coupling means is tightened down.

44. A device as in claim 43, said annular projecting means being shaped to radially wedge said multi-strand current transfer wire in the radially outward direction.

45. Connection means as in claim 43, said compression forces being applied around the annular extents of said annular projecting means and said multi-strand current wire whereby said electrical connection between said elements extends around said annular extents.

46. Connection means as in claim 43, said flexible conduit also containing a pair of insulated control wires embedded in and coextending lengthwise with the multi-strand current transfer wire of the flexible conduit, said body member extension being of dielectric material, electrical leads carried within the walls of said body member extension, said leads projecting forwardly or distally from the distal end of said body member extension whereby the distal ends of said insulated control wires of said flexible conduit may be easily stripped and connected to said electrical leads prior to the interengagement and tightening down of said coupling means.

47. Connection means as in claim 46, a handle body surrounding said body member extension, control switch means carried by said handle body, and electrical connection means between said body member extension and said handle body for connecting said electrical leads to said control switch means.

48. Connection means as in claim 47, said body member extension being of generally cylindrical shape, said handle body being rotatable with respect to said body member extension, said electrical connection means comprising slip ring means.

* * * * *